US008543297B2

(12) United States Patent
Soltana et al.

(10) Patent No.: US 8,543,297 B2

(45) Date of Patent: Sep. 24, 2013

(54) METHOD OF LIMITING A CLOSING FORCE OF A MOTORIZED OPENING

(75) Inventors: Reda Soltana, Sully sur Loire (FR); Paul Bizard, Lagny sur Marne (FR)

(73) Assignee: Inteva Products France SAS (FR)

( * ) Notice: Subject to any disclaimer, the term of this patent is extended or adjusted under 35 U.S.C. 154(b) by 729 days.

(21) Appl. No.: 12/552,336

(22) Filed: Sep. 2, 2009

(65) Prior Publication Data

US 2010/0106379 A1 Apr. 29, 2010

(30) Foreign Application Priority Data

Sep. 2, 2008 (FR) ..................................... 08 04806

(51) Int. Cl.
*G05D 1/00* (2006.01)

(52) U.S. Cl.
USPC ........................................................... 701/49

(58) Field of Classification Search
USPC ..................... 701/36, 49; 318/264, 280, 445, 318/446
See application file for complete search history.

(56) References Cited

U.S. PATENT DOCUMENTS

| | | | | |
|---|---|---|---|---|
| 5,832,664 | A | 11/1998 | Tajima et al. | |
| 6,043,616 | A * | 3/2000 | Redelberger | 318/9 |
| 6,043,620 | A * | 3/2000 | Koestler | 318/282 |
| 6,051,945 | A | 4/2000 | Furukawa | |
| 6,208,101 | B1 | 3/2001 | Seeberger et al. | |

FOREIGN PATENT DOCUMENTS

GB 1592748 7/1981

OTHER PUBLICATIONS

French Search Report dated Apr. 17, 2009.

* cited by examiner

*Primary Examiner* — Kim T Nguyen

(74) *Attorney, Agent, or Firm* — Cantor Colburn LLP

(57) ABSTRACT

A method of limiting a closing force of a motorized opening on a sealing line of a motor vehicle includes the step of calculating the closing force at each instant in a displacement of the opening while closing. The closing force is calculated by a difference between a force applied to the opening when an edge of the opening is situated in an area of or squashes the sealing line and a force applied to the opening just before the edge of the opening penetrates into the area of or squashes the sealing line. The method further includes the step of stopping an electric motor driving the opening when the closing force reaches a constant predetermined value. The closing force can be limited regardless of the climatic conditions or the operating conditions of the motor vehicle.

6 Claims, 2 Drawing Sheets

METHOD OF LIMITING A CLOSING FORCE OF A MOTORIZED OPENING

REFERENCE TO RELATED APPLICATION

This application claims priority to French Patent Application No. 0804806 filed Sep. 2, 2008.

BACKGROUND OF THE INVENTION

The present invention relates to a method of limiting a closing force of a motorized opening on a sealing line of a motor vehicle, such as a window regulator window in a door seal, an opening/tilting roof, a motorized sliding side door, or a motorized swinging door (tailgate or trunk lid), etc.

In particular, a motorized window regulator makes it possible to open or close, by a window, an opening situated in a motor vehicle door. While the window is closing, a top edge of the window penetrates, for example, into a seal situated at a top of an opening of the door.

The force needed to raise the window in a door frame, called a transfer force, is roughly constant before the top edge of the window reaches the seal.

An additional force, called a closing force, is the force added to the transfer force to enable the top part of the window to penetrate into the seal in order to completely close the window, then to enable the seal to be squashed by the top edge of the window in order to ensure air and water tightness. The sum of the transfer force and the closing force is called a total force.

When the seal is squashed so that its reaction force no longer allows the window to advance, the window is subjected to a so-called blocking force. It is then at a top mechanical end stop.

However, the blocking force depends on the power supply voltage to the window regulator's electric motor. Thus, if the window is closed when the motor of the motor vehicle is switched off, the window has reached a mechanical end stop position. If the power supply voltage to the window regulator's electric motor is increased, for example when the engine of the motor vehicle is running, the blocking force increases. Now, because the window is in a mechanical end stop position, the increase in voltage is translated into an increase in the mechanical stresses on the components of the window regulator located between the window regulator's electric motor and the window, such as, for example, the sliders, and, for a cable-operated window regulator, the pulleys, the drum and the cables. This excess blocking force provides no additional benefit in the sealing process and unnecessarily limits the life of the window regulator. It is therefore advantageous to limit the closing force in order to increase the life of the window regulator.

The document U.S. Pat. No. 6,208,101 proposes a method for limiting surplus force of an electronically controlled window regulator when a top edge of a window abuts against a seal. This method includes the continuous detection of the positions of the window during the displacement of the window. This method also includes the recording of at least one measured value. This measured value is correlated with a total force applied to the window after a top edge of the window has entered to a depth of at least 25% of a seal area. The measured value is increased by a predetermined quantity to define a stop criterion so that the window regulator is stopped when this criterion is reached or exceeded. The stop criterion is therefore generated on the basis of at least one quantity measured after the top edge of the window has penetrated into the seal.

One drawback of this method is that the stop criterion depends on the total force applied to the window in the seal. In very cold weather, the total force applied to the window in the seal is very great. The closing force will not therefore be limited, or will be limited only very little in very cold weather, which means that the mechanical stresses on the components of the window regulator cannot be avoided.

There is therefore a need to limit the closing force regardless of the climatic or operating conditions of the motor vehicle.

SUMMARY OF THE INVENTION

The invention provides a method of limiting a closing force of a motorized opening on a sealing line of a motor vehicle. A driving system for the motorized opening includes an electric motor driving the opening having an edge. The method includes the step of calculating a closing force at each instant in a displacement of the opening while closing. The closing force is calculated by a difference between a total force applied to the opening when the edge of the opening is situated in an area of the sealing line or squashes the sealing line and the transfer force applied to the opening just before the edge of the opening penetrates into the area of the sealing line or squashes the sealing line. The method also includes the step of stopping the electric motor driving the opening when the closing force reaches a predetermined value, the predetermined value being a constant.

According to another particular feature, the method also includes the step of determining the force applied to the opening at each instant. According to another particular feature, the total force and the transfer force are determined according to a speed of the electric motor and a voltage applied to the electric motor. According to another particular feature, the method also includes the step of continually measuring a position of the opening. According to another particular feature, the step of stopping the electric motor includes recording the position of the opening at the moment of stopping the electric motor, called a software closing position. According to another particular feature, when the opening is actuated to be closed when the edge of the opening is situated in the area of the sealing line or squashes the sealing line, the opening is positioned in the software closing position recorded last.

BRIEF DESCRIPTION OF THE DRAWINGS

Other characteristics and benefits of the invention will become apparent from the following detailed description of the embodiments of the invention, given purely by way of example and with reference to the drawings, which show.

DETAILED DESCRIPTION OF THE PREFERRED EMBODIMENT

Figure 4:
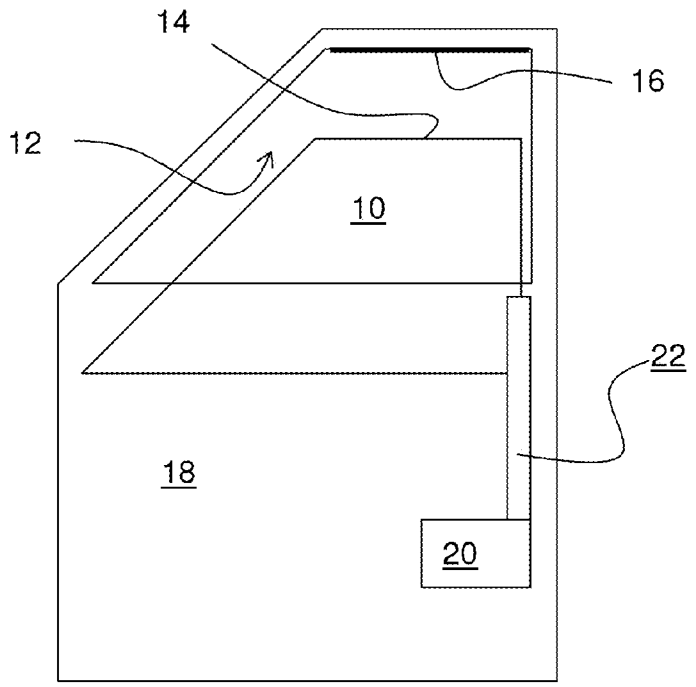
FIG. 4 illustrates a vehicle door.
Figure 5:
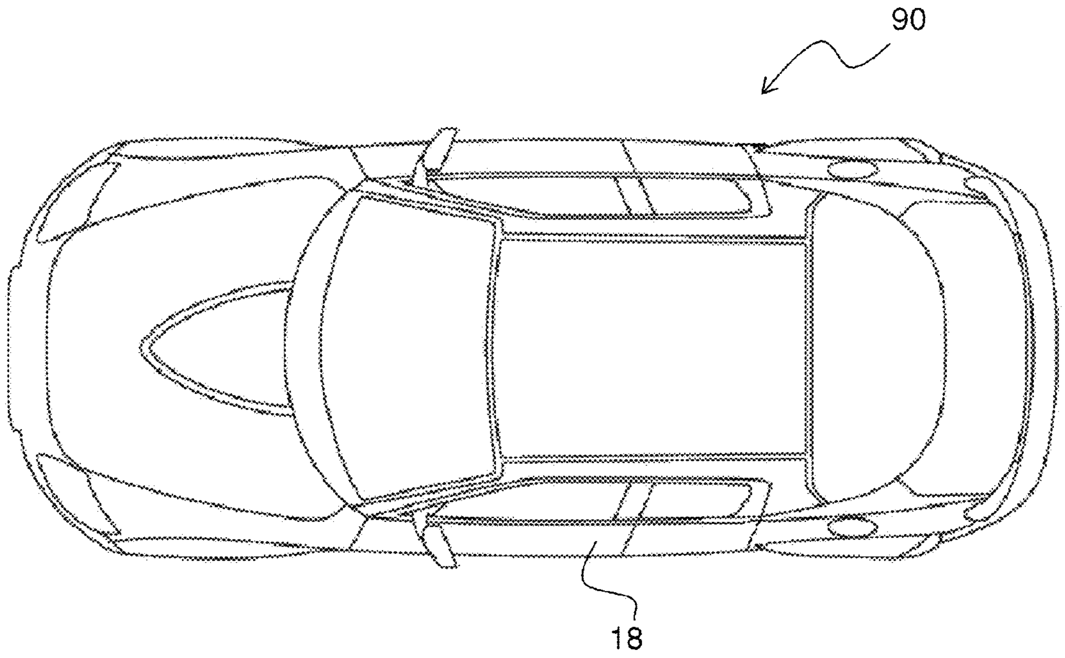
FIG. 5 illustrates a vehicle.

The invention relates to a method of limiting a closing force of a motorized opening 12 on a sealing line of a motor vehicle 90 (shown in FIG. 5). As shown in FIG. 4, a driving system for the opening 12 includes an electric motor 20 driving the opening 12, and the opening 12 includes an edge. The method includes the step of calculating a closing force at each instant in a displacement of the opening 12 while closing and the step of stopping the electric motor 20 driving the opening 12 when the closing force reaches a predetermined value. The closing force is calculated by the difference between a total force applied to the opening 12 when the edge of the opening 12 is situated in an area of the sealing line or squashes the sealing line and a transfer force applied to the opening 12 just before the edge of the opening 12 penetrates into the area of the sealing line or squashes the sealing line. The predetermined value is a constant.

The closing force according to the invention does not depend on the transfer force, unlike the method of U.S. Pat. No. 6,209,101. The closing force is a constant. Thus, the closing force does not depend on the climatic or operating conditions of the motor vehicle 90. The closing force is therefore well limited regardless of the climatic conditions or the operating conditions of the motor vehicle 90. The seal area is the area situated inside a seal 16, delimited by two sides of the seal 16 and a bottom of the seal 16.

Hereinafter in the description, the motorized opening 12 described as an example will be a motorized window regulator window 10. However, the invention also relates to other motor vehicle motorized openings 12, such as an opening/tilting roof, a motorized sliding side door, a motorized swinging door (tailgate or trunk lid), etc. Thus, the description of the window 10 and of the window regulator 22 should not be taken to be limiting.

The sealing line associated with the window 10 is a seal 16 including two edges and a bottom. In other cases, such as for a motorized swinging door, for example, the sealing line is, for example, a seal 16 of cylindrical section. Hereinafter in the description, only a seal 16 including two edges and a bottom will be described, in a nonlimiting manner.

Figure 1:
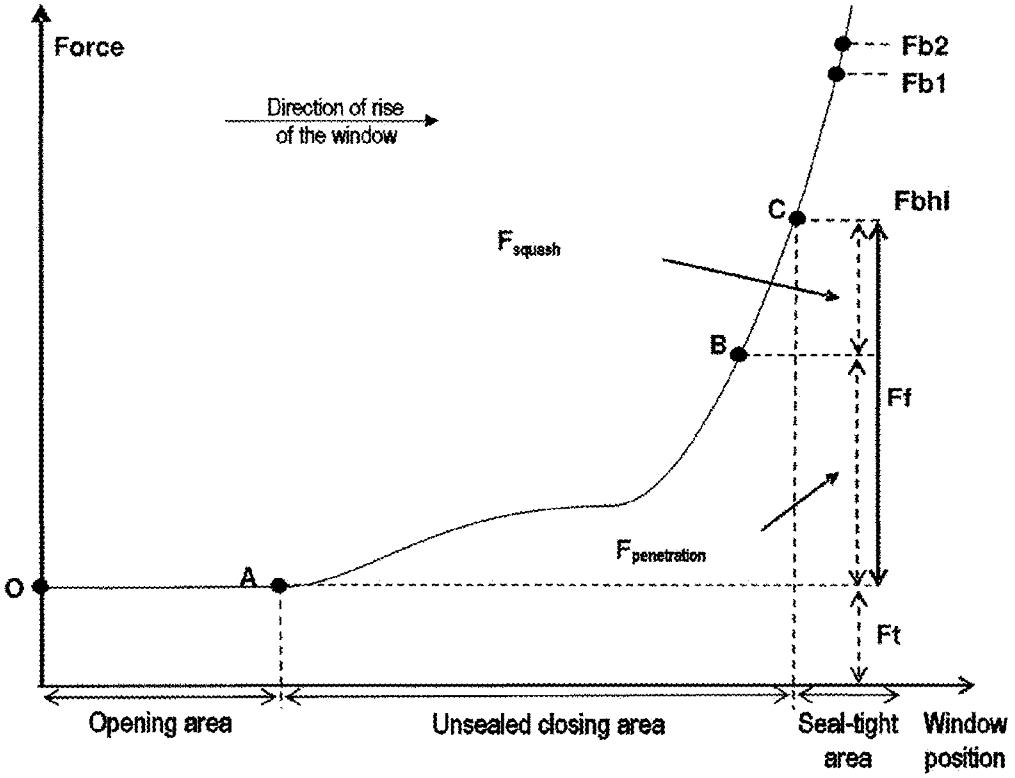
FIG. 1 illustrates a curve representing a force applied to a window of a motorized window regulator according to a position of the window.

FIG. 1 shows a curve representing a force applied to a window 10 of a motorized window regulator 22 according to a position of the window 10. The curve is plotted for a given temperature.

A window regulator 22 includes an electric motor 20 suitable for a window 10 being raised or lowered. In one example, the window 10 is used to close an opening 12 formed in a motor vehicle door 18. In this case, the window 10 includes a top edge 14 adapted to penetrate into a seal 16 situated at a top of the opening 12 formed in a door 18 of a motor vehicle 90. However, the invention also relates to the windows 10 actuated by motorized window regulators 22 in doors 18 without a frame. In this case, the top edge 14 of the window 10 penetrates into a seal 16 situated in a roof of the motor vehicle 90.

The electric motor 20 of the window regulator 22 applies a force to the window 10 via different components of the window regulator 22, such as, for example, in the case of a cable-operated window regulator, pulleys, sliders, etc. This force enables the window 10 to be raised or lowered in order to release or close the opening 12 formed in the door 18 of the motor vehicle 90.

The force applied to the window 10 by the electric motor 20 is directly correlated to the operating conditions of the electric motor 20. Thus, in the method of limiting the closing force, the force applied to the window 10 by the electric motor 20 is determined according to a speed of the electric motor and a voltage applied to the electric motor 20. The force is therefore determined simply by direct correlation with the window regulator's 22 electric motor 20.

The force applied to the window 10 is determined at each instant while the window regulator 22 is operating. Thus, the value of the force is available at each instant. This makes it possible to select force values that are of interest for the method, in particular, the value of the force applied to the window 10 just before the top edge 14 of the window 10 penetrates into the seal area and the value of the force applied to the window 10 when the top edge 14 of the window 10 is in the seal area or squashes the seal 16.

Figure 2:
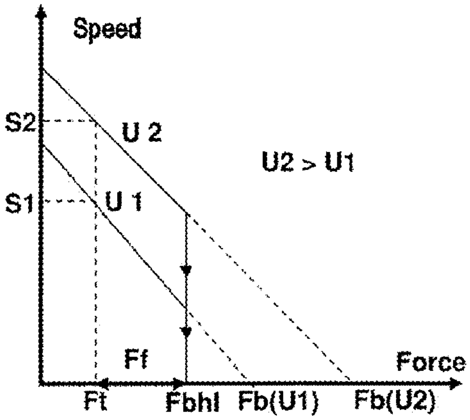
FIG. 2 illustrates a curve representing a speed of the window regulator's electric motor according to the force applied to the window in the event of a voltage fluctuation.
Figure 3:
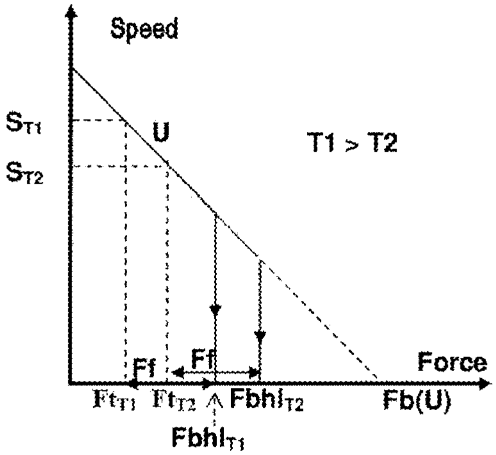
FIG. 3 illustrates a curve representing the speed of the window regulator's electric motor according to the force applied to the window in the event of a temperature fluctuation.

The method of limiting the closing force also includes the step of continually measuring the position of the window 10. Thus, the position of the window 10 is also known at each instant. This also makes it possible to select force values that are of interest for the method, in particular the value of the force applied to the window 10 just before the top edge 14 of the window 10 penetrates into the seal area and the value of the force applied to the window 10 when the top edge 14 of the window 10 is in the seal area or squashes the seal 16. Thus, the speed can be determined according to the force, as represented in FIGS. 2 and 3, by derivation of the position.

In FIG. 1, the window begins to rise toward the door seal 16 at the point O. The window is subject to a transfer force, which enables the window 10 to rise before it reaches the seal 16. As FIG. 1 shows, the transfer force is substantially constant. Between the points O and A, the window 10 is at least partially open.

At the point A, the top edge 14 of the window 10 reaches the seal 16. Between the points A and B, the top edge 14 of the window 10 is in the seal area. The penetration of the top edge 14 of the window 10 into the seal area makes it possible to completely close the opening 12 formed in the door 18 of the motor vehicle 90, but without ensuring its seal-tightness. As FIG. 1 shows, the force applied to the window 10 for the window to be able to penetrate into the seal area, called a penetration force, increases relative to the transfer force to overcome the friction forces against the sides of the seal 16.

At the point B, the top edge 14 of the window 10 reaches the bottom of the seal 16. As FIG. 1 shows, the force applied to the window 10 for the window to be able to compress the seal 16, called a squashing force, is even higher than the penetration force. This makes it possible to ensure the seal-tightness of the opening 12 formed in the door 18 of the motor vehicle 90. However, a non-zero minimum squashing force is necessary to ensure the seal-tightness of the opening 12.

The limiting method includes the step of calculating the closing force at each instant while the window 10 is rising. The closing force is calculated by the difference between the force applied to the window 10 when the top edge 14 of the window 10 is situated in the seal area or squashes the seal 16, called a total force, and the transfer force Ft.

When the closing force reaches a predetermined value Ff, the window regulator's 22 electric motor 20 is stopped. The predetermined value Ff is a constant. This constant is supplied by the user of the method, for example by an automobile manufacturer. This predetermined value is preferably sufficient for the opening 12 formed in the door 18 of the motor vehicle 90 to be completely closed and air-tight and water-tight. The predetermined value Ff generally corresponds to the minimum closing force defined by the user of the method. Thus, the closing force does not depend on climatic conditions or on the operating conditions of the motor vehicle 90, as will be seen later with FIGS. 2 and 3.

The total force on stopping the electric motor 20, when the closing force reaches the predetermined value Ff, is the sum of the transfer force Ft and the predetermined value Ff. The total force when the electric motor 20 is stopped is called a software top end stop force Fbhl, or even a software closing force. The software top end stop force Fbhl is less than the blocking force Fb at the usual voltages (see Figures). The blocking force is the force applied to the window 10 when the window 10 is in a mechanical end stop position, that is to say, when the seal 16 is squashed by the top edge 14 of the window 10, so that the reaction force of the seal 16 no longer allows the window 10 to advance. When the software top end stop force Fbhl is applied to the window 10, the window 10 is in the software top end stop position or else in the software closure position.

At the point C of FIG. 1, the window 10 is in the software top end stop position. The software top end stop position is below the mechanical end stop position; Fbhl is less than Fb1 or Fb2. Fb1 and Fb2 are blocking forces for two different voltages. Fb1 corresponds, for example, to a voltage applied to the window regulator's 22 electric motor 20 of 14V and Fb2 corresponds, for example, to a voltage applied to the window regulator's 22 electric motor 20 of 16V. Thus, in the sealing area, the locking force increases very rapidly while the top edge 14 of the window 10 progresses only very little into the seal 16. This is why it is important to limit the closing force in order to increase the life of the window regulator 22.

In the event of an increase in the power supply voltage to the electric motor 20, for example when the engine of the motor vehicle 90 is running, the method of limiting the closing force makes it possible to avoid the mechanical stresses on the components of the window regulator 22 located between the electric motor 20 of the window regulator 22 and the window 10, such as, for example, the sliders, pulleys, drum for a cable-operated window regulator 22. Thus, if the window 10 had been closed when the engine of the motor vehicle 90 was switched off, the window 10 has reached a software top end stop position. In the event of an increase in the power supply voltage to the window regulator's 22 electric motor 20, for example if a user once again orders the window 10 to rise when the engine of the motor vehicle 90 is running, the window 10 will remain in the software top end stop position and therefore not lead to additional stresses on the elements of the window regulator 22.

FIG. 2 shows a curve representing the speed of the window regulator's 22 electric motor 20 according to the force applied to the window 10 in the event of a fluctuation in the power supply voltage to the electric motor 20.

Two different power supply voltages U1 and U2 for the electric motor 20, U2 being greater than U1, give different corresponding transfer speeds S1 and S2. In particular, the higher the power supply voltage becomes, the faster the speed becomes. On the other hand, the transfer force Ft does not vary with the power supply voltage to the electric motor 20. Thus, the software top end stop force, which is the sum of the transfer force Ft and of the predetermined closing force value Ff, does not vary with the power supply voltage. As can be seen in FIG. 2, the blocking force Fb increases with the power supply voltage to the window regulator's 22 electric motor 20, but not the software top end stop force Fbhl.

FIG. 3 represents a curve representing the speed of the window regulator's 22 electric motor 20 according to the force applied to the window 10 in the event of a fluctuation in temperature.

For an electric motor 20 power supply voltage U, two temperatures T1 and T2, T1 being greater than T2, lead to different corresponding transfer speeds $S_{T1}$ and $S_{T2}$ and different transfer forces $Ft_{T1}$ and $Ft_{T2}$. In particular, the lower the temperature becomes, the lower the speed becomes and the more the transfer force Ft increases. The software top end stop force, which is the sum of the transfer force Ft and of the predetermined closing force value Ff, increases when the temperature drops. However, as can be seen in FIG. 3, the software top end stop force $Fbhl_{T2}$ for the highest temperature remains very much less than the blocking force Fb. This makes it possible to avoid the mechanical stresses on the components of the window regulator 22 located between the window regulator's 22 electric motor 20 and the window 10.

In practice, the predetermined value Ff of the closing force is chosen so that it is both sufficient to ensure the seal-tightness of the opening 12 and not too great to allow the software top end stop force to still be less than the blocking force, regardless of the conditions, in particular temperature conditions.

Moreover, the position of the software top end stop is recorded each time the window regulator's 22 electric motor 20 is stopped according to the method of limiting the closing force.

The record of the position of the software top end stop is useful in particular when the window regulator 22 is actuated to raise the window 10 when the top edge 14 of the window 10 is already in the seal area or squashing the bottom of the seal 16.

In practice, in this particular case, the closing force cannot be calculated since the transfer force is not known. When the window 10 is actuated to be closed when the top edge 14 of the window 10 is situated in the seal area or squashing the seal 16, the window 10 is positioned in the software top position recorded last.

Obviously, the present invention is not limited to the examples and to the embodiment described and represented, but lends itself to numerous variants accessible to those skilled in the art. Thus, as mentioned hereinabove, the method of limiting a closing force applies equally to a motorized window regulator window and to a motorized opening/tilting roof, a motorized sliding side door, a motorized swinging door (tailgate or trunk lid), etc.

The foregoing description is only exemplary of the principles of the invention. Many modifications and variations are possible in light of the above teachings. It is, therefore, to be understood that within the scope of the appended claims, the invention may be practiced otherwise than using the example embodiments which have been specifically described. For that reason the following claims should be studied to determine the true scope and content of this invention.

What is claimed is:

1. A method of limiting a closing force of a motorized opening on a sealing line of a motor vehicle, wherein a driving system for the motorized opening includes an electric motor that drives the opening, the opening including an edge, the method comprising the steps of:

calculating a closing force at each instant in a displacement of the opening while closing, the closing force being calculated by a difference between a total force applied to the opening when the edge of the opening is situated in an area of the sealing line or squashes the sealing line and a transfer force applied to the opening just before the edge of the opening penetrates into the area of the sealing line or squashes the sealing line; and stopping the electric motor that drives the opening when the closing force reaches a predetermined value, the predetermined value being a constant and wherein the closing force does not depend on climate conditions of the motor vehicle.

2. The method as claimed in claim 1, including the step of determining each instant of the transfer force or the total force applied to the opening.

3. The method as claimed in claim 1, wherein the total force and the transfer force are determined according to a speed of the electric motor and a voltage applied to the electric motor.

4. The method as claimed in claim 1 including the step of continually measuring a position of the opening.

5. The method as claimed in claim 4, wherein the step of stopping the electric motor includes recording the position of the opening at a moment of stopping the electric motor, wherein the position is a software closing position.

6. The method as claimed in claim 5, wherein, when the opening is actuated to be closed when the edge of the opening is situated in the area of the sealing line or squashes the sealing line, the opening is positioned in the software closing position recorded last.

* * * * *